April 8, 1941.  S. M. COVELL  2,237,656
CAMERA
Filed Dec. 28, 1938  4 Sheets-Sheet 1
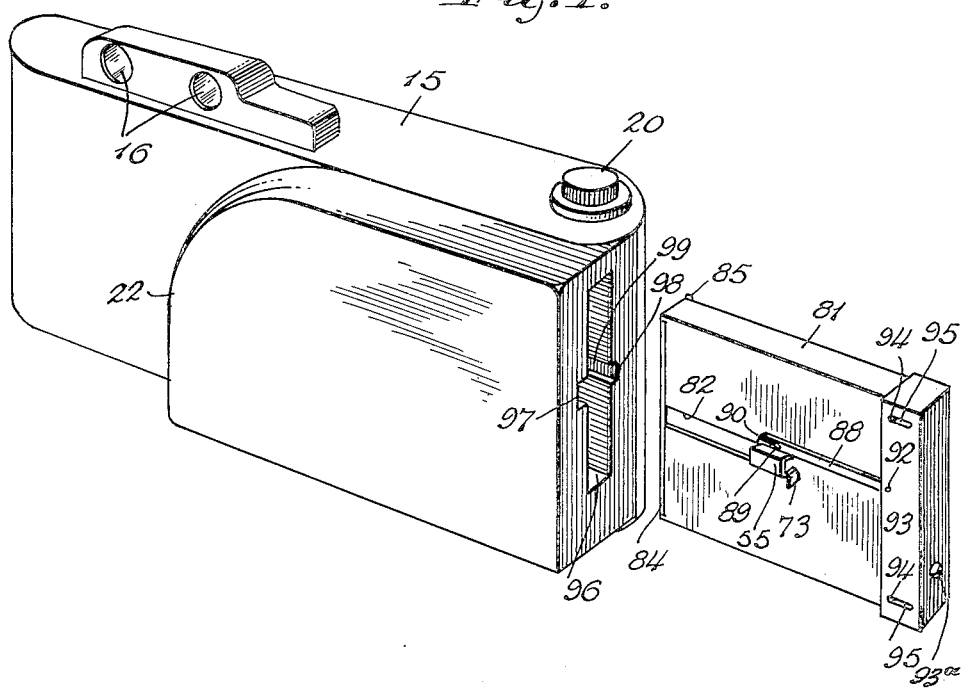
Fig. 1.
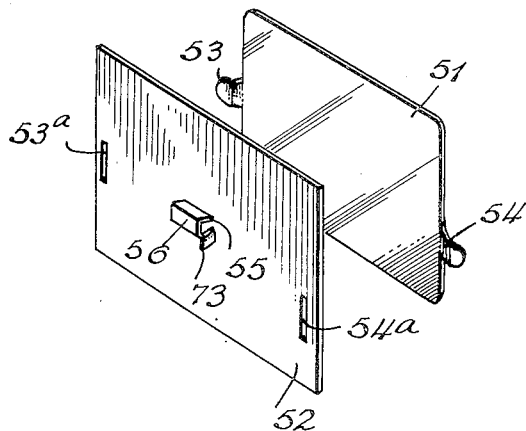
Fig. 11.
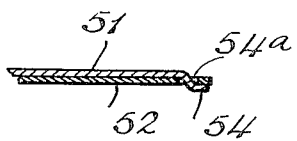
Fig. 12.
INVENTOR.
SHELDON M. COVELL
BY
ATTORNEY.

April 8, 1941.　　　　S. M. COVELL　　　　2,237,656
CAMERA
Filed Dec. 28, 1938　　　　4 Sheets-Sheet 2

Fig. 2.

INVENTOR.
SHELDON M. COVELL
BY
ATTORNEY.

April 8, 1941.　　　　S. M. COVELL　　　　2,237,656
CAMERA
Filed Dec. 28, 1938　　　　4 Sheets-Sheet 3
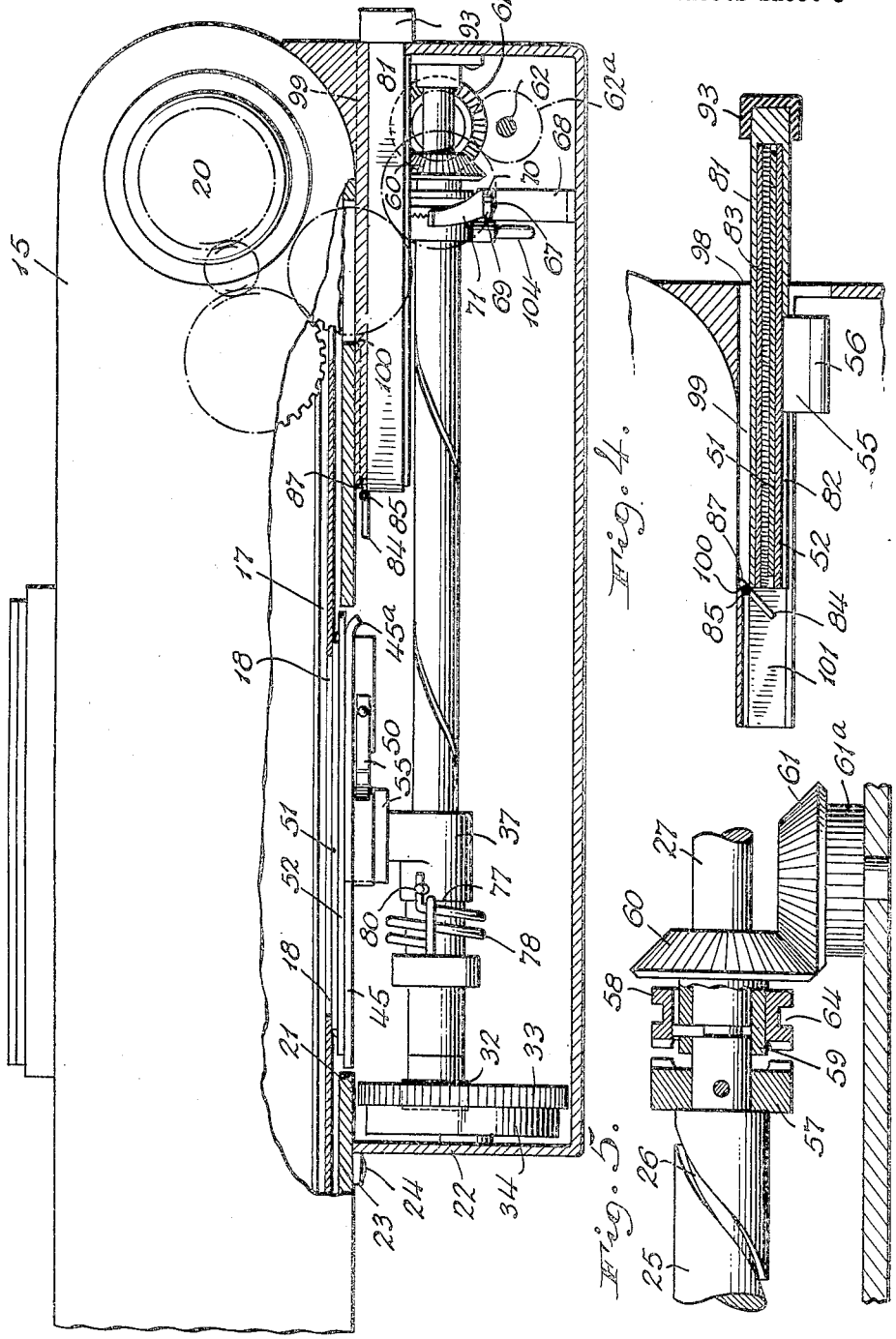
INVENTOR.
SHELDON M. COVELL
BY
ATTORNEY.

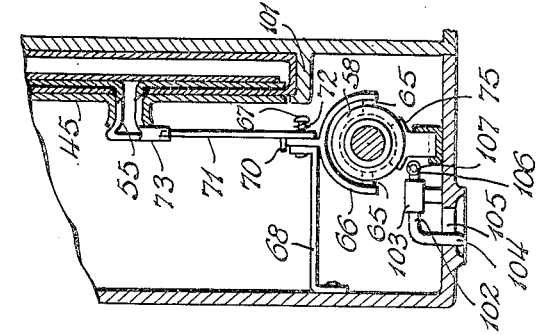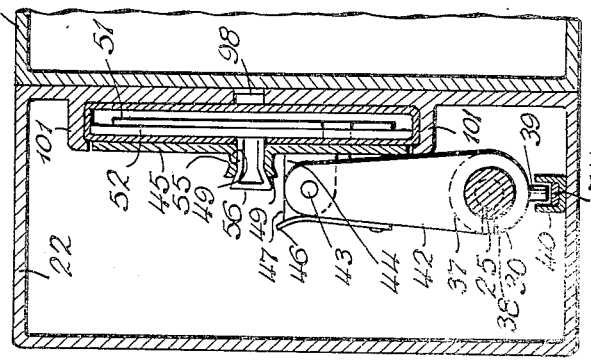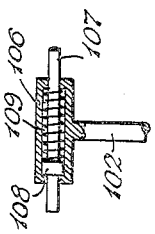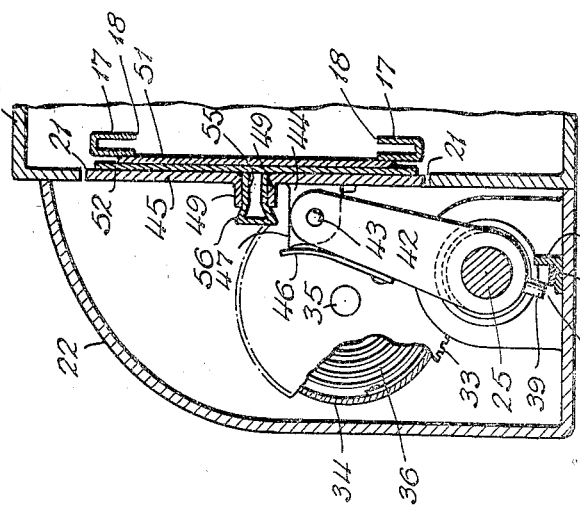

Patented Apr. 8, 1941

2,237,656

UNITED STATES PATENT OFFICE 2,237,656

CAMERA

Sheldon M. Covell, New York, N. Y.

Application December 28, 1938, Serial No. 248,058

12 Claims. (Cl. 95—23)

The invention relates to photographic cameras of the type in which a roll of sensitized film is progressively exposed for taking successive photographs, and more particularly to that class of such cameras in which a thirty-five millimeter film with thirty-six exposures is utilized. Under existing conditions, development and printing of such films is delayed until all of the exposures have been successively made, and it accordingly is extremely inconvenient to secure prints of any given picture, as for instance, the first one taken, before a given film has been used, unless the photographer is willing to waste the rest of the film. In addition, if the photographer desires to substitute one type of photographic film for another, such as for instance color film for ordinarily film, it is necessary to remove one roll of film from the camera and to replace the same with another roll of the film desired.

The invention has for its object to provide a camera of the indicated type constructed in a novel manner to overcome the aforesaid objections and to enable the photographer to develop and print individual pictures immediately or at any time subsequent to the taking thereof. The invention contemplates further the provision of a novel film designed for use in the novel camera.

Other more specific objects will appear from the description hereinafter and the features of novelty will be pointed out in the claims.

In the accompanying drawings, which illustrate an example of the invention without defining its limits, Fig. 1 is a perspective view of the novel camera in the process of being loaded; Fig. 2 is a fragmentary longitudinal section of the camera; Fig. 3 is a fragmentary plan view partly in horizontal section; Fig. 4 is a detail horizontal section illustrating the loading of the camera; Fig. 5 is an enlarged fragmentary detail view of a portion of the operating mechanism; Fig. 6 is a cross-section on the line 6—6 of Fig. 2; Fig. 7 is a similar view on the line 7—7 of Fig. 2; Fig. 8 is a fragmentary section substantially on the line 8—8 of Fig. 2; Fig. 9 is a detail view of a setting device included in the mechanism; Fig. 10 is a detail view of a releasing means forming part of said setting device; Fig. 11 is a detail perspective view showing a film and the film carrier or plate in separated relation, and Fig. 12 is a detail section showing the film attached to the film carrier or plate.

The camera in the form illustrated comprises a customary casing 15 provided with the usual lens and other features commonly found in conventional cameras, including finders as indicated at 16. Interiorly the casing 15 may be provided with shutter tracks 17 for the accommodation of the customary shutter which operates in the well-known way to control the exposure opening 18 located in registry with the lens in the conventional way. To enable the common type of film, such as for instance, thirty-five millimeter film with thirty-six exposures, to be used in the camera, the casing 15 includes gear mechanism 19 for operatively supporting and controlling the conventional spools on which such films are wound, this mechanism 19 itself being actuated to progressively adjust the film relatively to the exposure opening 18 in the well-known way by means of an operating knob 20 mounted on the casing 15 so as to be exteriorly accessible as shown in Figs. 1 and 2. In practice the spool carrying the film is mounted at one end of the casing 15 interiorly thereof and is threaded along the rear faces of the shutter tracks 17 or their equivalent, to a winding-up spool mounted interiorly of the casing at the other end of the casing 15. The winding-up spool is rotatively operated at will by the knob 20 to bring successive portions of the film into registry with the exposure opening 18 for exposure therethrough. The means whereby said successive portions of said film are clamped or held in place at said exposure opening 18 will be described more fully hereinafter.

In its rear wall the illustrated casing 15 is provided with an opening 21 in registry with and of somewhat larger dimensions than the exposure opening 18, said opening 21 communicating with the interior of an auxiliary casing 22; the latter is secured in place on the casing 15 preferably so as to be readily removable at will and accordingly may include lugs 23 for the accommodation of screws 24 whereby the removable attachment is effected. A shaft 25 having a helical groove 26 extending lengthwise thereof is located in the lower portion of the auxiliary casing 22 and has its opposite reduced end sections 27 and 28 rotatably mounted respectively in bearing brackets 29 and 30; as shown in Fig. 2, the bracket 29 is fastened to the one end wall of the auxiliary casing 22 and the bracket 30 is secured upon the bottom thereof and includes a bearing sleeve 31 through which the end section 28 of the shaft 25 extends. The projecting portion of said section 28 carries a pinion 32 which meshes with a gear 33 forming part of a spring motor, consisting of a casing 34 carried by a pin 35 fixed upon the opposite end wall of the auxiliary casing 22. The spring motor further includes a coil spring 36 having one end fastened to the pin 35 and its other end secured to the casing 34; it will be understood that the gear 33 and casing 34 are arranged to rotate as a unit on the pin 35 in one direction to wind the spring 36 and in the other direction by the action of said spring 36 as will appear more fully hereinafter.

A carrier or nut 37 is mounted on the shaft 25 and includes a pin 38 which projects into the helical groove 26 and in co-operation therewith serves to shift said carrier or nut 37 lengthwise of said shaft 25 as the latter is rotated on its axis in one direction or the other. To maintain the carrier or nut 37 against rotation with the shaft 25, said carrier 37 carries a second pin 39 which projects radially outward therefrom into a grooved guideway 40 fixed upon the bottom of the auxiliary casing 22 as illustrated in Fig. 2; near its left hand end in Fig. 2 the guideway 40 is interrupted as indicated at 41 in Fig. 7 to enable the second pin 39 to move transversely out of said guideway 40 and thereby permit the carrier or nut 37 to rotate with said shaft 25 in one direction for the purpose to be more fully set forth hereinafter.

An arm or member 42 projects radially upward from the carrier or nut 37 and at its upper end is pivotally connected at 43 with a lug 44 which extends outwardly from a film carrier 45; a leaf spring 46 fixed on the arm 42 in engagement with a projection 47 forming part of the lug 44 yieldingly maintains the film carrier 45 in predetermined operative relation to said arm 42 throughout the operative range of the latter. The film carrier 45 includes a slot 48 having an open entry end at the right hand side thereof and terminating in a closed end at an intermediate point of said carrier 45 as shown in Fig. 2, and is further provided with spaced parallel flanges 49 located along the opposite longitudinal edges of said slot 48 and projecting outwardly from the carrier 45 as illustrated in Figs. 2, 6 and 7. The one flange 49, for instance the upper one in Fig. 2 is shorter than the other flange 49, and both of said flanges terminate at a distance from the closed end of said slot 48 for the purpose to be more fully set forth hereinafter. The shorter, or specifically the upper flange 49, carries a resilient catch or detent 50 which extends beyond said flange 49 as shown in Fig. 2.

In the novel arrangement, each individual film 51 is mounted upon a film plate 52 in surface engagement therewith in any convenient manner so as to be readily removable at will; for instance said film 51 preferably being formed at one end with a tab 53 which is centrally located at said one end, and at the opposite end is provided with a similar tab 54 located in off-set relation to the tab 53. To receive the tabs 53 and 54 and thereby attach the film 51 to the film plate 52, the latter is provided with properly located slots 53ᵃ and 54ᵃ; to facilitate introduction into the slots 53ᵃ and 54ᵃ and to avoid flexing the film 51 on the plate 52, the tabs 53 and 54 may be shaped as illustrated in Figs. 11 and 12. In addition to their other functions, the tabs 53 and 54 serve also to facilitate handling of the film 51. On its outer surface the film plate 52 carries an outwardly projecting lug 55 preferably flaring outwardly as indicated at 56.

Suitable means is provided for locking the shaft 25 against rotation and for releasing said shaft 25 at the proper moment to permit the nut 37 and its associated parts to be shifted lengthwise thereof in the operation of the camera. In the illustrated example, the aforesaid means comprises a clutch member 57 fixed upon the shaft 25, and a co-operating clutch member 58 slidable into and out of operative connection with the clutch member 57. To lock the clutch member 58 against operation when in engagement with the clutch member 57, the member 58 is keyed upon a sleeve 59 for slidable movement thereon and to rotate therewith, said sleeve 59 as shown in Fig. 5 being loosely mounted on the end section 27 of the shaft 25 and forming part of a bevel gear 60. The latter meshes with an associate bevel gear 61 combined with a pinion 61ᵃ suitably journalled in the auxiliary casing 22 for instance as shown in Fig. 5; the pinion 61ᵃ in turn meshes with an associate pinion 62ᵃ carried by an upright shaft 62 rotatably mounted in the auxiliary casing 22 and provided at its upper end with a pinion 63 meshing with the mechanism 19. With this arrangement the clutch members 57 and 58 when in operative engagement, are locked against rotation by the bevel gears 60, 61, the pinions 61ᵃ and 62ᵃ, the upright shaft 62 and the pinion 63 in co-operation with the mechanism 19, and thereby lock the shaft 25 against relative rotation on its axis; at the same time, the aforesaid mechanical means may be operated by means of the knob 20 to manually rotate the shaft 25 for the purpose to be more fully described hereinafter.

The clutch member 58 is automatically disengaged from the clutch member 57, as will hereinafter be more fully pointed out, and accordingly is provided with a circumferential groove 64 for the accommodation of pins 65 carried by a forked member 66 pivoted at 67 upon a bracket 68 suitably fixed in position interiorly of the auxiliary casing 22. The forked member 66 is provided with a lug or tooth 69 located in the path of a pin 70 carried by a lever 71 also pivoted at 67 on said bracket 68; it will be understood that although the forked member 66 and the lever 71 have the common pivot 67, said lever 71 is pivotally movable in one direction independently of the member 66 and in the opposite direction actuates the latter through the engagement of the pin 70 with the lug or tooth 69. In order to maintain the parts in operative association with each other, a coil spring 72 may be mounted on the pivot 67 between the head of the latter and lever 71 as shown in Fig. 8; the spring 72 serves also to return the lever 71 to its normal position with the pin 70 in contact with the lug or tooth 69 and to maintain it in said normal position. The lever 71 extends upwardly from the pivot 67 and has its upper end in the path of a projection 73 depending from the lug 55. The clutch member 58 is further controlled by a tripping slide 74 mounted on the bottom of the guideway 40 and having a fork 75 at its one end which extends into the circumferential groove 64 and at its other end with an upright fork 76 which projects into the path of an annular shoulder 77 formed at an intermediate point of the carrier or nut 37.

A torsion spring 78 surrounds the shaft 25 adjacent the bearing bracket 30 and has its one end secured thereto, the other free end of said spring 78 being in engagement with a projection 79 fixed upon said bracket 30 as illustrated in Fig. 2, the arrangement being such that the spring 78 is held under a torsional tension for the purpose which will be pointed out hereinafter. The spring 78 is sufficiently large in internal diameter to permit the carrier or nut 37 to pass through the same into engagement with the bearing bracket 30, as shown in Fig. 2; the carrier or nut 37 carries an upright projection 80 arranged to engage the free end of the spring 78 at certain stages in the operation of the camera.

Each film 51 and its associated film plate 52 are contained in a magazine 81 with the film plate 52 in interior surface engagement with one wall of the magazine 81 and covering a slot 82 extending longitudinally of said wall from an intermediate point of said plate 52 to the forward edge of said magazine wall as shown in Figs. 1 and 2; the film 51 carried by the plate 52 is located on the inside of the magazine 81 preferably in surface contact with a lining 83 of soft material such as velvet or the like. The lug 55 of the film plate 52 projects outwardly through the slot 82 of the magazine 81 and initially is located at the inner closed end of said slot 82 as shown in Figs. 1 and 4. The forward end of the magazine 81 is open and normally is closed by means of a cover 84 hinged at 85 on the magazine 81 and controlled by a suitable spring 86 in a manner to maintain said cover 84 in its closed position and to return it thereto. At a suitable point the cover 84 is provided with a lug or projection 87 which extends beyond the hinge connection 85 as shown in Figs. 3 and 4. To lock the film plate 52 and the film 51 carried thereby against unintentional displacement in or removal from the magazine 81, the latter is provided with a latch member 88 having an inclined slot 89 for the accommodation of a pin 90 on the magazine. The latch member 88 has a hook 91 at its free end, and at its other end is pivotally connected at 92 with a cap 93 movably fitted over the rear end of the magazine 81 as illustrated in Figs. 1, 2, 3, and 4; co-operating pins 94 and slots 95 limit the outward movements of the cap 93 relatively to the magazine.

In the normal condition of the loaded magazine 81, the hook 91 of the member 88 projects over and in front of the lug 55 as shown in Fig. 1, and thereby locks the film plate 52 and film 51 in the magazine 81; at the same time, the cover 84 is in its closed position so that said film 51 is fully protected against light, it being understood that the parts are arranged and constructed to make the magazine 81 absolutely light proof.

To enable successive magazines 81 to be introduced into the camera, the auxiliary casing 22 is provided in its one end wall with an opening 96 so dimensioned that the magazine 81 will snugly fit the same to provide a light-proof fit. At its one side the opening 96 is recessed as illustrated at 97 for the passage of the lug 55 into the interior of said auxiliary casing 22 as shown in Figs. 1 and 4; the opposite side of the opening 96 is recessed at 98 to provide an entry for the projection 87 of the cover 84 into a channel 99 extending lengthwise of the inner wall of the auxiliary casing 22 in registry with said recess 98 as illustrated in Fig. 1. The channel 99 at its exit end portion within the casing 22 is of reduced depth to thereby form a shoulder 100 at an intermediate point of said channel 99 as shown in Figs. 3 and 4. To guide the movement of each magazine 81 into the auxiliary casing 22 and to properly support said magazine 81 in its fully inserted position therein, channelled guide flanges 101 are located on the inner wall of the auxiliary casing 22 in spaced parallel relation and in registry respectively with the upper and lower edges of the opening 96 as illustrated in Fig. 2.

To enable the novel camera to be adjusted at will for use with the conventional rolls of film, a manually operated setting device is provided preferably on the bottom wall of the auxiliary casing 22. In its illustrated form the setting device includes a releasing means comprising a slide 102 mounted in a bearing 103 fixed upon the bottom wall of the auxiliary casing 22 and provided at one end with a depending fingerpiece 104 movable in a slot 105 in said bottom wall so as to be exteriorly accessible when operation thereof is desired. At its other end the slide 102 carries a cylinder 106 in which a releasing plunger 107 is slidably mounted, said plunger 107 projecting outwardly beyond the opposite ends of said cylinder 106 as shown in Fig. 10. Interiorly of the cylinder 106 the plunger 107 carries a collar 108 and a coil spring 109 located between and in engagement respectively with said collar 108 and the one end wall of said cylinder 106. For co-operation with the plunger 107, in the manner to be more fully explained hereinafter, the slide 102 and its cylinder 106 are shifted at will by means of the finger-piece 104, to move the plunger 107 into the path of the second pin 39 which depends from the carrier or nut 37.

As shown in Figs. 2, 3, and 7, the parts are in the position occupied thereby when a given film 51 is clamped in registry with the exposure opening 18 of the camera; for purpose of description, it will be assumed that the particular film 51 has been exposed by the photographer in the operation of taking a picture and that the exposed film 51 is ready to be returned to the magazine located in the auxiliary casing 22 at the right hand side thereof in Figs. 2 and 3.

To effect this return, the knob 20 is manually rotated to correspondingly rotate the upright shaft 62 and its pinion 62ª to thereby transmit rotary motion to the associated pinion 61ª and bevel gear 61 and thus rotatively actuate the bevel gear 60 and clutch member 58 which at this stage is in operative connection with the co-operating clutch member 57 fixed on the reduced end section 27 of the shaft 25; as a result of these operations, the latter is rotated in its bearings 29 and 30. The operations described are such that the aforesaid rotation of the shaft 25 will be in a direction against the operating tension of the spring motor, the spring 36 of which accordingly will be rewound. Because of the fact that at this stage, the second pin 39 of the carrier or nut 37 is out of the grooved guideway 40 as illustrated in Figs. 2 and 7, no resistance will be developed against the rotation of said carrier or nut 37 about its axis; the pin 38 which projects into the helical groove 26 acting as a key accordingly causes the carrier or nut 37 to rotate with the shaft 25 until the second pin 39 engages and is stopped by the one wall of the grooved guideway 40. The described rotation of the carrier or nut 37 with the shaft 25 is assisted by the torsion spring 78 acting on the pin 80 and carries with it the arm or member 42 and swings the latter toward the left in Fig. 7 whereby the film carrier 45, the film plate 52 and the film 51 carried thereby are correspondingly shifted to a position in which the arm or member 42 is in upright vertical relation to the shaft 25, and the second pin 39 of the carrier or nut 37 is back in the grooved guideway 40. As a result further rotation of the carrier or nut 37 with the shaft 25 is arrested and continued rotation of the latter in its bearings 29 and 30 will now be relative to said carrier or nut 37; through the co-operation of the pin 38 with the helical groove 26 this continued relative rotation of the shaft 25 will cause said carrier or nut 37 to travel lengthwise of said shaft 25 toward the right in Figs. 2 and 3.

The arm or member 42 with the film carrier 45, film plate 52 and the film 51 are carried toward the magazine 81 along with the carrier or nut 37 in this movement toward the right. As the curved edge 45ᵃ of the film carrier 45 finally contacts with the open end of the magazine 81, the film carrier 45 and the film plate 52 will be separated so that as the movement of the parts to the right continues, the film carrier 45 will move along the magazine 81 in external surface contact therewith, and the film plate 52 and the film 51 carried thereby will correspondingly move through the open end of the magazine 81 into the interior thereof. During these movements the lug 55 of the film plate 52 will travel lengthwise of the slot 82 of said magazine 81 until the inner closed end of said slot is reached as illustrated by dotted lines in Fig. 2; in this position of the parts, in which the exposed film 51 is contained within the magazine 81, the projection 73 depending from the lug 55 is contiguous to the upper end of the lever 71 as shown in Fig. 2.

The magazine 81 in which the exposed film 51 is now contained may now be removed from the camera by exerting a pull toward the right upon the cap 93 in Figs. 2 and 3. This causes said cap 93 to move relatively to the magazine 81 to the extent permitted by the pins 94 and slots 95 and accordingly developes a pull toward the right upon the latch member 88; this will cause the pin 90 to exert a camming action on the slot 89 of said member 88 whereby the hook 91 is forced downwardly into locking engagement with the lug 55, and the film plate 52 and film 51 are locked against unintentional displacement relatively to the magazine 81. As the withdrawal of the latter from the auxiliary casing 22 continues, the projection 87 of the cover 84 will be shifted into the deepest portion of the guide channel 99 and said cover 84 will be adjusted to its closed position by the spring 86; thus when the magazine 81 is fully withdrawn from the camera, said magazine 81 will be sealed against the entrance of light and the exposed film 51 therein will be protected against being light struck or otherwise harmed. It will be understood, as the magazine 81 is withdrawn from the auxiliary casing 22, that the lug 55 will force the detent 50 upwardly to an inoperative position to permit said lug 55 to move along and out of the slot 48 of the film carrier 45. As this takes place, the projection 73 depending from said lug 55 will engage the lever 71 and swing it to the dotted line position in Fig. 2 and then pass out of the camera with said magazine 81. When the projection 73 has passed beyond the lever 71, the latter by the action of the spring 72 will immediately be restored to its normal operative position with the pin 70 in contact with the lug 69 as shown by full lines in Fig. 2.

The exposed film 51 in the magazine 81 may be removed therefrom in a dark room or other suitable place for development and printing at the will of the operator. The particular magazine 81 may then be reloaded with a new unexposed film 51 fixed upon the film plate 52, for re-insertion into the camera, or another magazine 81 with a film 51 therein may be inserted into the auxiliary casing 22; in any event, the operation of reloading the camera may proceed as follows:

The loaded magazine 81 with the cover 84 closed and the other parts in their normal positions is inserted into the opening 96 with the projection 87 in registry with the entering recess 98 of the channel 99 and the lug 55 in registry with the recess 97. The magazine 81 is then advanced through said opening 96 by exerting a push upon the cap 93; this causes the latter to initially move relatively to the magazine 81 toward the left in Fig. 1 and thereby correspondingly moves the latch member 88 and causes the pin 90 by acting on the slot 89 to lift the hook 91 thereof to release the lug 55 from restraint. As the insertion proceeds by continued pressure on the cap 93, the top and bottom of the magazine 81 will travel along the guide flanges 101 and the projection 87 of the cover 84 will pass along the deepest portion of the channel 99; meanwhile the lug 55 will pass into and along the slot 48 and between the flanges 49 of the film carrier 45 which at this stage is located at the right hand portion of the auxiliary casing 22.

As the movement of the magazine 81 into the auxiliary casing 22 continues, the projection 87 will finally engage the shoulder 100 in the channel 99 and the cover 84 of said magazine 81 will be swung to its open position against the tension of the spring 86. The aforesaid inward movement will finally bring the cap 93 into engagement with the end wall of the auxiliary casing 22 at which time the magazine is in its completely inserted position in the camera. In substantial coincidence with completion of the insertion of the magazine 81 into the camera, the detent 50 will snap in front of the lug 55 to lock the film plate 52 and film 51 in operative connection with the film carrier 45, and the projection 73 of said lug 55 will swing the lever 71 to the left in Fig. 2. By the action of the pin 70 on the lug 69 the fork 66 will thereby be pivotally actuated to shift the clutch member 58 away from the clutch member 57 and to thus release the shaft 25 from restraint. As this occurs, the spring 36 of the spring motor will actuate the gearing 33—32 to rotate the shaft 25 in a direction to cause its helical groove 26 in co-operation with the pin 38 to shift the carrier or nut 37 lengthwise of said shaft 25 toward the left in Figs. 2 and 3 until said carrier or nut 37 engages the bearing 30 and projects into the torsion spring 78, as illustrated in Fig. 2. At this stage, the pin 80 of said carrier or nut 37 is located in engagement with the free end of said torsion spring 78 and further movement of said carrier or nut 37 along said shaft 25 toward the left is arrested, with the second pin 39 in registry with the interruption 41 of the grooved guideway 40. Continued rotation of the shaft 25 under the influence of the motor spring 36 will accordingly cause the carrier or nut 37, by the action of its pin 38 and the helical groove 26, to be correspondingly rotated and thereby swing the arm or member 42 from its upright position to the inclined position illustrated in Fig. 7. This operation will correspondingly shift the film carrier 45 and film plate 52 to thereby firmly clamp the film 51 carried thereby against the shutter tracks 17 or their equivalent, in registry with the exposure opening 18 of the camera. As the carrier or nut 37 and its associated elements are operated in the manner described above, the pin 80 will act on the free end of the torsion spring 78 to store operative energy therein ready for the return of the parts to their former positions subsequent to the exposure of the film 51 for picture taking purposes. The described movement of the carrier or nut 37 along the shaft 25 toward the left brings the shoulder 77 into engagement with the forked member 76 and by acting on the latter shifts the slide 74 toward the left in Fig. 2; this brings about a corresponding movement of the forked member 75 and thereby returns the clutch member 58 into operative connection with the associate clutch member 57.

After the exposure of the given film 51, which may be made in the conventional manner at the will of the photographer, the mechanism may be operated by the knob 20 in the manner previously described, to return the exposed film 51 to its magazine 81 preparatory to its removal from the camera.

To enable the operator to load the magazine 81 in the dark, a projection 93ᵃ may be formed on an external surface of the cap 93 which indicates the bottom portion of said magazine 81; by feeling for said projection 93ᵃ the correct position of the magazine for loading may be accurately determined even in the dark. The previously mentioned tabs 53 and 54 being out of registry with each other correspondingly indicate the correct position of the film 51 for introduction into the magazine 81 and accordingly make it readily possible to accurately load the latter in a dim light or even in complete darkness.

If it is desired to utilize the illustrated camera with a conventional roll of film, the latter is placed in position and threaded into operative position behind the shutter tracks 17 or their equivalent in the customary way; by suitably operating the knob 20 and its associated mechanism, the first sensitive section of the film is adjusted into registry with the exposure opening 18 ready for exposure at the will of the photographer. Previously to this, the finger-piece 104 is shifted in the slot 105 to the right in Fig. 8 to thereby bring the plunger 107 into registry with the forked member 75 located at one end of the slide 74 and into the path of the pin 39 depending from the carrier or nut 37.

With the parts thus adjusted, an operation of the knob 20 to bring a sensitive section of the film into registry with the exposure opening 18 will rotate the shaft 25 in a direction to initially rotate the carrier or nut 37 therewith and thereby shift the arm or member 42 to an erect position and with it the film carrier 45 and to subsequently move said carrier or nut 37 and its associated parts lengthwise of said shaft 25 to the right in Figs. 2 and 3 in the same way as previously set forth herein. In this way, the pin 39 will finally engage the plunger 107 and shift it against the tension of the spring 109 in the cylinder 106 to thereby develop a pressure against the forked member 75; the latter is thus moved to the right and shifts the clutch member 58 away from and out of engagement with the clutch member 57. This causes the shaft 25 to be released from restraint and permits the motor spring 36 to rotate said shaft 25 and shift the carrier or nut 37 lengthwise thereof until the bearing 30 arrests this movement, whereupon the carrier or nut 37 is rotated with the shaft 25 to swing the arm or member 42 in the manner previously described and to cause the film carrier 45 to clamp the selected sensitive section of the film against the shutter tracks 17 or their equivalent, in registry with the exposure opening ready for exposure therethrough. As the carrier or nut 37 moves along the shaft 25 to the left, the plunger 107 will be restored by the spring 109 to its normal position in the cylinder 106 and away from the forked member 75. In the same way as previously described herein, the shoulder 77 of the carrier or nut 37 as the latter travels to the left along the shaft 25 will eventually engage the forked member 76 and move the slide 74 in a direction to cause the forked member 75 to shift the clutch member 58 back into connection with the clutch member 57; when this has been done, the mechanism is set and ready for shifting another sensitized section of the film into position for exposure and for repeating the aforesaid operation of the parts. When the roll of film has been exposed to the desired extent either entirely or otherwise, it is wound up in the conventional way and removed from the camera for development and printing in the customary manner.

The novel camera is simple in construction and operation, and may be efficiently utilized in connection with successive individual films capable of being independently developed and printed at the will of the photographer, or with the conventional films, as for instance thirty-five millimeter films each having thirty-six exposures. In either case, the camera requires no particular skill in its operation other than that necessary to produce satisfactory photographs with any type of camera. When the individual films 51 are used in the camera, each film 51 subsequent to its exposure in the camera may be removed therefrom for development and printing at the will of the photographer and without waiting for any other films to be exposed. Copies of any particular photograph may accordingly be had immediately after the exposure of the particular film or in other words, as soon as the latter can be developed and printed.

In addition, the novel camera enables the photographer to easily and quickly substitute one type of photographic film for another; for instance, an ordinary film may be replaced by a color film or any other different type of film at the will of the operator.

Various changes in the specific forms shown and described may be made within the scope of the claims without departing from the spirit of the invention.

I claim:

1. In a photographic camera, the combination of a casing having an exposure opening, means whereby the sensitized sections of a ribbon of photographic film may be adjusted into exposure registry with said exposure opening, and means whereby separate individual films may be conveyed into exposure registry with said exposure opening, said means being capable of selective use independently of each other.

2. In a photographic camera comprising a casing having an exposure opening, the combination of means for conveying independent sensitized films in said casing into registry with said exposure opening and for clamping each film in exposure registry therewith, and for immediately shifting each film in said casing away from said exposure opening at the completion of its exposure therethrough for removal from said camera.

3. In a photographic camera comprising a casing having an exposure opening, the combination of a magazine designed to receive and contain a single sensitized film, said magazine and its contained single film being removably mounted in said casing, and means for withdrawing said film from said magazine and transferring it therefrom within said casing into registry with said exposure opening for exposure therethrough.

4. In a photographic camera comprising a casing having an exposure opening, the combination of a magazine designed to receive and contain a single sensitized film, said magazine and its contained single film being removably mounted in said casing, and means for removing said film from said magazine, transferring the removed film within said casing into registry with said exposure opening for exposure therethrough, and returning the exposed film into said magazine at the completion of its exposure.

5. In a photographic camera comprising a casing having an exposure opening, the combination of a magazine removably inserted into said casing and containing an individual sensitized film designed for a single exposure, and means for withdrawing said film from said magazine, transferring said withdrawn film within said casing into clamped registry with said exposure opening for exposure therethrough and for returning said individual film subsequent to exposure to said magazine for removal therewith from said camera.

6. In a photographic camera comprising a main casing having an exposure opening and an opening in its rear wall in registry therewith, the combination of an auxiliary casing mounted on said rear wall of said main casing in interior communication with the rear wall opening thereof and itself having a magazine opening in its one end wall, guide flanges located within said auxiliary casing in registry with the upper and lower edges respectively of said magazine opening, an operating shaft journalled in said auxiliary casing and provided with a helical groove extending lengthwise thereof, a spring motor operatively connected with said shaft for rotating it in one direction, a carrier on said shaft, a pin on said carrier projecting into said helical groove, a member extending upwardly from said carrier, a film carrier pivotally connected with said member and supported thereby, a clutch member fixed on said shaft, a co-operating clutch member loosely and slidably mounted on said shaft, mechanism operatively connected with said co-operating clutch member for locking said shaft against operation by the spring motor and for operating said shaft in opposition to said spring motor when said clutch members are in connection with each other to shift said carrier and film carrier toward said magazine opening, releasing means for disengaging said co-operating clutch member from the associated clutch member, a magazine containing a film plate and a film mounted thereon, said magazine extending through said magazine opening into said auxiliary casing and being maintained in place therein by said guide flanges, means whereby said film plate and film carrier are automatically coupled together as the latter is moved toward said magazine opening, and means on said film carrier for operating said releasing means to disengage said clutch members whereby said shaft is rotated by said spring motor to shift said carrier and film carrier with the film plate and film thereon into registry with said exposure opening.

7. In a photographic camera including an exposure opening, the combination of a magazine in said camera containing a single sensitized film, an operating shaft located within said camera and having a helical groove extending lengthwise thereof, a spring motor for operating said shaft in one direction, a carrier on said shaft, a key on said carrier projecting into said helical groove, a supporting member mounted on said carrier, mechanism including co-operating clutch members for locking said shaft against operation by said spring motor and for rotating said shaft in opposition to said spring motor to shift said carrier and supporting member into operative relation to said magazine, co-operating means on said magazine and supporting member for automatically coupling said film to the latter, and means for disengaging said clutch members whereby said shaft is actuated by said spring motor to shift said carrier and supporting member in a direction to remove said film from said magazine and to transfer said film into registry with said exposure opening and to clamp it in place thereat.

8. In a photographic camera including an exposure opening and having a magazine opening in one of its walls, a magazine containing a single sensitized film adapted to be inserted through said magazine opening into said camera, a hinged cover at one end of said magazine for closing said end, a spring whereby said cover is maintained in and returned to its closed position, co-operating means on said cover and camera effective interiorly of the latter whereby said cover is adjusted to its open position as said magazine is inserted into the camera, and mechanism whereby said single film is removed from said magazine and transferred into registry with said exposure opening and clamped in place thereat.

9. In a photographic camera comprising a casing having an exposure opening, the combination of a magazine located within said casing in spaced relation to said exposure opening, a film plate removably mounted in said magazine and carrying a single sensitized film, conveying means, co-operating devices on said film plate and said conveying means for automatically connecting said film plate with said conveying means, one actuating means for operating the conveying means in one direction for shifting said film plate out of said magazine and within said casing to adjust the film carried by said film plate into registry with said exposure opening for photographic exposure therethrough, and another actuating means for operating said conveying means in a reverse direction to return said film plate and the film carried thereby into said magazine subsequent to the photographic exposure of said film.

10. In a photographic camera comprising a casing having an exposure opening, the combination of a magazine located within said casing in spaced relation to said exposure opening, a film plate removably mounted in said magazine and carrying a single sensitized film, motor actuated means operable in one direction to shift said film plate out of said magazine and within said casing to adjust the film carried by said film plate into registry with said exposure opening for photographic exposure therethrough, and manually operated means for operating said motor actuated means in a reverse direction for returning said film plate and the film carried thereby into said magazine subsequent to the photographic exposure of said film.

11. In a photographic camera comprising a casing having an exposure opening, the combination of a magazine located within said casing in spaced relation to said exposure opening, a film plate removably mounted in said magazine and carrying a single sensitized film, conveying means, a spring motor for operating said conveying means in one direction to shift said film plate out of said magazine and within said casing to adjust the film carried by said film plate into registry with said exposure opening for photographic exposure therethrough, and means for operating said conveying means in a reverse direction to return said film plate and the film carried thereby into said magazine subsequent to the photographic exposure of said film and for coincidentally rewinding said spring motor.

12. In a photographic camera comprising a casing having an exposure opening, the combination of a magazine located within said casing in spaced relation to said exposure opening and provided with a slot open in a direction toward said exposure opening, a film plate removably mounted in said magazine and carrying a single sensitized film, a lug on said film plate projecting outwardly therefrom through said slot, a film carrier having a slot open in opposed relation to the slot of said magazine arranged to receive the lug of said film plate, a detent on said film carrier arranged to engage said lug whereby said film plate and film carrier are coupled together, operating means whereby said film carrier is shifted in said casing to withdraw said film plate and the film carried thereby from said magazine and to adjust said film into registry with said exposure opening for photographic exposure therethrough, and means whereby said operating means is actuated to shift said film carrier in said casing in a manner to return said film plate and the film carried thereby into said magazine subsequent to the exposure of said film.

SHELDON M. COVELL.